United States Patent [19]

Becker

[11] Patent Number: 4,651,246

[45] Date of Patent: Mar. 17, 1987

[54] LIFTING AND LOWERING MECHANISM FOR THE MAGNETIC HEAD OF A FLOPPY DISK DRIVE

[75] Inventor: Gerhard Becker, Neunkirchen, Fed. Rep. of Germany

[73] Assignee: U.S. Philips Corporation, New York, N.Y.

[21] Appl. No.: 742,659

[22] Filed: Jun. 10, 1985

Related U.S. Application Data

[63] Continuation of Ser. No. 355,836, Mar. 8, 1982, abandoned.

[30] Foreign Application Priority Data

Mar. 14, 1981 [DE] Fed. Rep. of Germany ....... 3109932

[51] Int. Cl.[4] .......................... G11B 5/54; G11B 21/12
[52] U.S. Cl. ......................................... 360/105; 360/99
[58] Field of Search .................................. 360/97–99, 360/105

[56] References Cited

U.S. PATENT DOCUMENTS

| | | | |
|---|---|---|---|
| 3,797,033 | 3/1974 | Prieur | 360/105 |
| 3,973,272 | 8/1976 | Morgan et al. | 360/105 |
| 4,040,106 | 8/1977 | Medley | 360/99 |
| 4,393,424 | 7/1983 | Vidwans | 360/105 |
| 4,396,963 | 8/1983 | Wright | 360/105 |
| 4,415,940 | 11/1983 | Becker | 360/105 |
| 4,419,703 | 12/1983 | Gruczelak et al. | 360/97 |
| 4,504,879 | 3/1985 | Toldi et al. | 360/97 |

OTHER PUBLICATIONS

Quinlan, "Magnetic Head Unload Mechanism", IBM Tech. Disc. Bull., vol. 22, No. 4, Sep. 1979, p. 1594.

*Primary Examiner*—Robert S. Tupper
*Attorney, Agent, or Firm*—David R. Treacy

[57] ABSTRACT

An actuating device for lifting and lowering a magnetic-head assembly of a drive mechanism of a magnetic-disk storage apparatus includes a landing lever associated with a laterally projecting cross-arm supported by a supporting plate which extends parallel to the landing lever. Via a guide lever pivotally mounted to a housing of the apparatus, the supporting plate is moved towards the diskette by a connecting rod against a spring force as soon as the front cover is closed.

7 Claims, 3 Drawing Figures

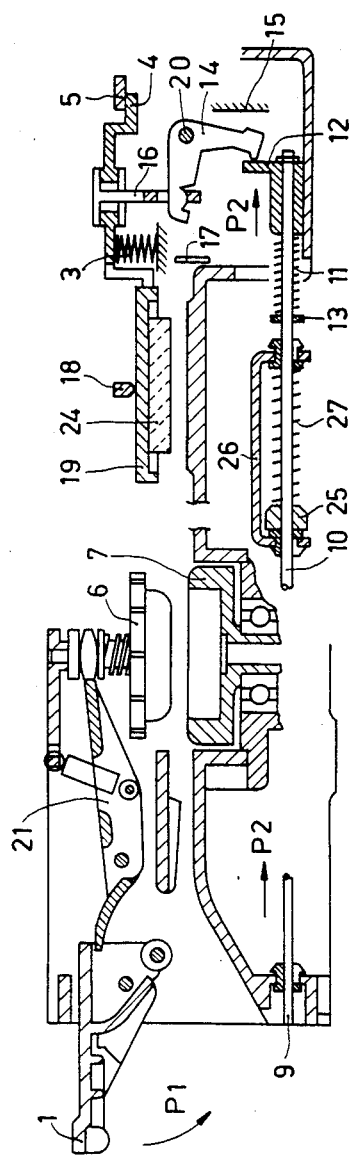
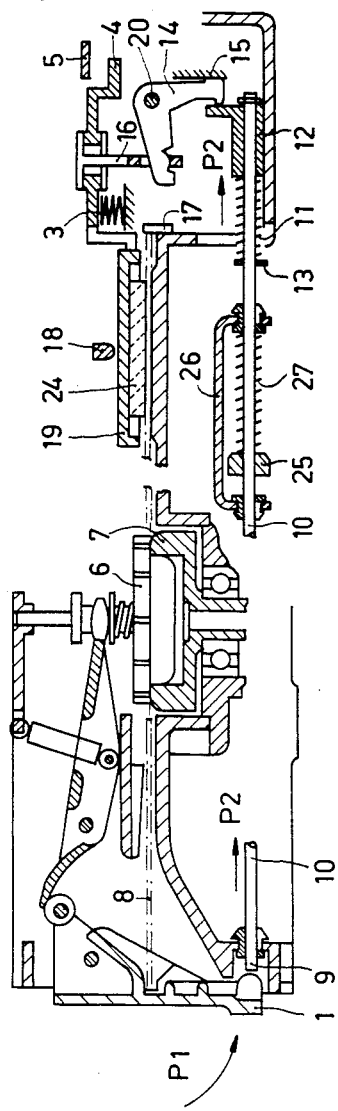
FIG. 1
FIG. 2

LIFTING AND LOWERING MECHANISM FOR THE MAGNETIC HEAD OF A FLOPPY DISK DRIVE This is a continuation of application Ser. No. 355,836, filed Mar. 8, 1982, now abandoned.

BACKGROUND OF THE INVENTION

The invention relates to an actuating device for lifting and lowering a landing lever carrying a magnetic-head assembly of a drive mechanism of a magnetic-disk storage apparatus. The storage apparatus has a front opening for the insertion of a flexible diskette such as those commonly called a "floppy disk". The opening can be closed by means of a pivotal front cover.

U.S. Pat. No. 3,678,481 describes a drive mechanism for a diskette which can be inserted after a cover, which extends over the entire drive mechanism, has been opened. By closing the cover, the diskette is centrally clamped between a clamping cone and a drivetable and is set into rotation. The protective cartridge of the diskette then remains stationary. This enclosure has a radial aperture through which the write and read head assembly can be lowered onto the flexible magnetic disk. For this purpose, there is provided an electromagnet whose armature extends up to the landing lever on which the magnetic head is arranged. When the electromagnet is energized, its armature releases the landing lever which then positions the magnetic head assembly on the magnetic disk under spring force. The armature also carries an adjustable resilient plate on which a pressure pad is arranged. When the magnetic head is lowered onto the magnetic disk, this pressure pad is urged against the diskette cartridge. This ensures a smooth rotation of the magnetic disk.

The electromagnet is program-controlled and can be actuated independently of the position of the cover. As a result, it is possible to remove the diskette from the drive mechanism without the magnetic-head assembly being lifted off the diskette. This may give rise to damage to the diskette and the magnetic head. Also, the known construction is intricate and requires a special control circuit for the magnets.

Moreover, it is known from U.S. Pat. No. 4,415,940 to provide the landing lever which carries the magnetic-head assembly with a cross-arm which cooperates with a shift lever which is inclined on both ends. When this shift lever is moved by the diskette, the magnetic-head assembly is lifted or lowered. For this purpose, the shift lever is moved by the diskette against the action of the spring, so that the magnetic-head assembly is automatically lifted and subsequently lowered when the diskette is inserted into or removed from the drive mechanism. A disadvantage of this is that the ejection device carrying the shift lever has to be moved by the diskette when it is inserted. The frictional forces between the inclined shift-lever arm and the cross-arm then act on the diskette. This increases the likelihood of the diskette being damaged.

SUMMARY OF THE INVENTION

It is an object of the present invention to provide an actuating device for lifting and lowering the magnetic-head assembly of a drive mechanism for a flexible magnetic-disk storage apparatus in which the movement of the front cover automatically produces the movement of the magnetic-head assembly, and in which the diskette is not subjected to excessive loads during insertion into the drive mechanism. Moreover, this should not lead to an increase of the comparatively small mounting height of the drive mechanism.

This object is achieved in that the landing lever is associated with a laterally projecting cross-arm, which is supported by a supporting plate which extends parallel to the landing lever, in that the supporting plate is arranged to be movable perpendicularly to the diskette by means of a guide lever, and in that during closure of the front cover a rod, which extends from the guide lever to said cover, moves the cover into a position in which the supporting plate is lowered towards the diskette. The guide lever then moves the supporting plate against the force of a spring which keeps the supporting plate and consequently the landing lever with the magnetic-head assembly in a position in which it is lifted off the diskette.

In a further embodiment of the invention a pressure pad is arranged on that side of the supporting plate which faces the diskette for cooperation with the diskette. When the supporting plate is lowered, the guide lever is positioned against a stationary stop and thereby limits the movement of the supporting plate in such a way that the pressure pad only exerts a light pressure on the diskette while the magnetic-head assembly, released by the supporting plate, resiliently cooperates with the flexible magnetic disk.

Suitably, the length of the supporting plate is selected so that it is greater than the possible travel of the magnetic-head assembly over the diskette 8 within the radial sector during operation. As a result of this, the cross-arm of the landing lever is always positioned above the supporting plate, so that the magnetic-head assembly may be lifted in any position which it assumes relative to the diskette when the front cover is being opened.

BRIEF DESCRIPTION OF THE DRAWING

An embodiment of the invention will be described in more detail, by way of example, with reference to the drawing. In this drawing:

FIG. 1 is a sectional view of the actuating device in a rest position with an open front cover, FIG. 2 is a sectional view of the actuating device in an operating position with the front cover closed and a diskette inserted.

Figure 3:
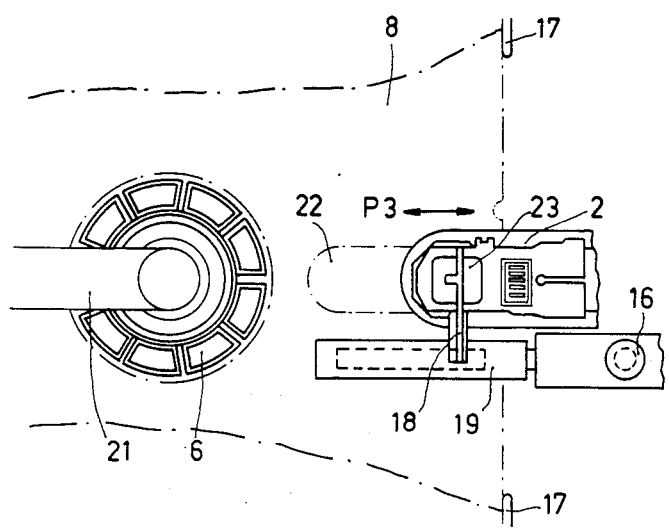
FIG. 3 is a plan view of a part of the actuating device near the magnetic-head assembly.

The construction of the diskette drive mechanism shown in FIGS. 1 and 2 is generally known per se. Only those parts of the drive mechanism are shown which are necessary for understanding the invention.

DESCRIPTION OF THE PREFERRED EMBODIMENTS

FIG. 1 shows the drive mechanism in the rest position. The mechanism does not contain a diskette. The front cover 1 is in an open position. As can be seen in FIG. 3, a supporting plate 19, which can be moved perpendicularly to the diskette 8, is arranged parallel to a landing lever 2 which carries a magnetic head 23. The guide system for such a movement of the supporting plate 19 is known per se and is, therefore, not shown in more detail in the Figures. The supporting plate 19 is moved against the force of a lifting spring 3 which is arranged on a stationary part of the drive mechanism. In this upper position, which is determined by the lifting spring 3, a projection 4 of the supporting plate 19 abuts with the stationary stop 5 of the drive mechanism. Since the front cover 1 is open, a clamping cone 6 is lifted off the drive table 7, so that a diskette 8 can be inserted. The diskette 8 is inserted until it butts against stops 17.

If, upon insertion of the diskette 8, the front cover 1 is moved in a closing direction P1, the clamping cone 6 and, thus, the inserted diskette 8 are centered and clamped onto the drive table 7, via a lever 21. As the closing movement continues, the front cover 1 finally strikes against a front end 9 of a rod 10 and moves said rod in the direction of an arrow P2 until the front cover 1 has reached a latched position of closure. This closed position is represented in FIG. 2.

At its front end 9 and also inside the drive mechanism, the rod 10 is journalled in a mounting bridge 26. This mounting bridge 26 is stationary. The bridge 26 constitutes an abutment for a return spring 27 whose other end urges against a switching ring 25 which is rigidly connected to the rod 10. This switching ring may be employed for the actuation of a microswitch via which the closed position of the front cover 1 can be detected. A slide 12, together with a spring 11 which bears against a ring 13 connected to the rod, is fitted onto the other end of the rod 10. The slide 12 acts on a guide lever 14, which is pivotable about the spindle 20. The other end of the guide lever 14 is connected to the supporting plate 19 by a connecting rod 16. When, upon closure of the front cover 1, the rod 10 is moved in the direction of the arrow P2, the slide 12 urges the guide lever 14 against a stop 15. During this pivotal movement of the guide lever 14, the supporting plate 19 is moved against the action of the lifting spring 3 towards the diskette 8 via the rod 16. On the side of the supporting plate 19 which faces the diskette 8, a pressure pad 24 is arranged. The pressure pad 24, for example, consists of foam rubber. The stop 15 limits the pivotal movement of the guide lever 14 in such a way that the pressure pad 24 only exerts light pressure on the protective cartridge of the diskette 8 and thereby prevents fluttering of the flexible magnetic disk.

As can be seen in FIG. 3, the supporting plate 19 extends parallel to the landing lever 2 which carries the magnetic head 23. During operation, the landing lever and the magnetic head are moved in the direction of an arrow P3. The magnetic head 23 is then passed through the aperture 22 of the diskette 8 and is positioned on the flexible magnetic disk. The length of the supporting plate 19 is selected to be slightly greater than the possible travel of the landing lever 2 in the direction of the arrow P3. The landing lever 2 comprises a lateral cross-arm 18 which extends over the supporting plate 19. When the guide lever 14 lowers the supporting plate 19 towards the diskette 8, the resiliently loaded landing lever 2 follows this movement until the magnetic head 23 contacts the magnetic disk.

The actuating device is reset by opening the front cover 1. As a result of this, the supporting plate 19 and consequently the landing lever 2 are lifted in that the process described in the foregoing is reversed. When the front cover 1 is opened, the return spring 27 moves the rod 10 in a direction opposite to that of the arrow P2. The slide 12 releases the guide lever 14 and, thus, the supporting plate 19 which can now be moved by the lifting spring 3. Via the connecting rod 16, the guide lever 14 is pivoted. Together with the supporting plate 19, the landing lever 2 is also lifted off the diskette 8 via the cross-arm 18.

This ensures that the landing lever and, thus, the magnetic-head assembly can only cooperate with the diskette when the front cover is closed. This precludes damaging of the vulnerable magnetic head by an inadvertent removal or insertion of the diskette, because the rod 10 is moved only when the front cover is almost closed. As a result of this, it is not possible to interfere with the interior of the drive mechanism.

What is claimed is:

1. A mechanism for lifting and lowering a magnetic head in an apparatus comprising:

a housing having a front opening adapted for receiving a flexible diskette into an operating position;

a cover pivotally mounted to the housing so that the front opening is opened and closed by opening and closing the cover; and a movable landing lever carrying a magnetic head, movable along a first direction between a lifted position in which the head is clear of a diskette being inserted into or ejected from the operating position, and a lowered position in which the head cooperates with a diskette which is in the operating position, characterized in that said mechanism comprises a cross-arm mounted on and extending laterally from the landing lever, a support plate, and means for mounting said plate to said housing to permit plate movement perpendicularly toward and away from the diskette in a direction substantially parallel to said first direction, said plate being disposed and dimensioned such that said plate extends under said arm in all positions of the landing lever, a guide lever pivotally mounted to the housing for movement in opposed lowering and lifting directions, connecting means, connecting the support plate to the guide lever so that the support plate is moved perpendicularly toward and away from the diskette responsive to pivotal movement of the guide lever in respective lowering and lifting directions, a rod extending from the guide lever to the front opening, and arranged for engagement by the cover for movement of the rod in a second direction between a cover-closed and a cover-slightly-open position, and coupling means, coupling said guide lever to said rod, for pivoting said guide lever between the lowering and lifting positions responsive to movement of the rod between the respective cover-closed and cover-slightly-open positions, said means including a spring for biasing the support plate away from the diskette.

2. A mechanism as claimed in claim 1, characterized in that said landing lever is movable along a third direction substantially perpendicular to said first direction, for scanning a disc which is in the operating position, and said support plate is elongated in a direction substantially parallel to said third direction.

3. A mechanism as claimed in claim 2, characterized in that said second and third directions are generally parallel.

4. A mechanism as claimed in claim 2, characterized in that the support plate has a side which faces the diskettes, and the apparatus comprises a pressure plate fixed to said side of the support plate for engaging and applying stabilizing pressure to a diskette which is in the operating position, said support plate and pressure plate moving together toward and away from the diskette in response to closing and opening the cover.

5. A mechanism for lifting and lowering a magnetic head in an apparatus comprising:
- a housing having a front opening adapted for receiving a flexible diskette into an operating position;
- a cover pivotally mounted to the housing so that the front opening is opened and closed by opening and closing the cover; and
- a movable landing lever carrying a magnetic head, movable along a first direction between a lifted position in which the head is clear of a diskette being inserted into or ejected from the operating position, and a lowered position in which the head cooperates with a diskette which is in the operating position, characterized in that said mechanism comprises a cross-arm mounted on the landing and extending laterally from the landing lever, a support plate, and means for mounting said plate to said housing to permit plate movement perpendicularly toward and away from the diskette in a direction substantially parallel to said first direction, said plate being disposed and dimensioned such that said plate extends under said arm in all positions of the landing lever, a guide lever pivotally mounted to the housing for movement in opposed lowering and lifting directions, connecting means, connecting the support plate to the guide lever so that the support plate is moved perpendicularly toward and away from the diskette responsive to pivotal movement of the guide lever in respective lowering and lifting directions, a rod extending from the guide lever to the front opening, and arranged for engagement by the cover for movement of the rod in a second direction between a cover-closed and a cover-slightly-open position, said rod having a stop adjacent said guide lever, a slide, slidably fitted to the rod and resiliently biased toward said stop on the rod in the direction of rod movement from the cover-slightly-open to the cover-closed position, said slide being arranged to engage the guide lever for pivoting the guide lever to the lowering position, and spring means for biasing the support plate away from the diskette.

6. A mechanism as claimed in claim 5, characterized in that the support plate has a side which faces the diskettes, and the apparatus comprises a pressure plate fixed to said side of the support plate for applying stabilizing pressure to a diskette which is in the operating position, said support plate and pressure plate moving together toward and away from the diskette in response to closing and opening the cover.

7. A mechanism as claimed in claim 6, characterized in that the mechanism comprises a further stop mounted to the housing and arranged such that, in the lowering position, the guide lever abuts said further stop to limit pressure of said pressure plate against the diskette.

* * * * *